United States Patent
Chang et al.

(10) Patent No.: US 9,584,052 B2
(45) Date of Patent: Feb. 28, 2017

(54) DRIVING SYSTEM, APPARATUS AND METHOD FOR SPINDLE MOTOR

(71) Applicant: MEDIATEK Inc., Hsin-Chu (TW)

(72) Inventors: Ming-Kuang Chang, Hsinchu County (TW); Chih-Lung Tai, Taipei (TW); Je-Shen Hu, Hsinchu (TW); Tzu-Ching Yang, Taoyuan (TW); Chi-Jui Lee, Taoyuan (TW)

(73) Assignee: MEDIATEK INC., Hsin-Chu (TW)

( * ) Notice: Subject to any disclaimer, the term of this patent is extended or adjusted under 35 U.S.C. 154(b) by 43 days.

(21) Appl. No.: 14/629,531

(22) Filed: Feb. 24, 2015

(65) Prior Publication Data
US 2016/0248356 A1    Aug. 25, 2016

(51) Int. Cl.
*H02K 21/26* (2006.01)
*H02P 6/18* (2016.01)
*H02P 27/08* (2006.01)
*H02P 6/08* (2016.01)

(52) U.S. Cl.
CPC ........... *H02P 6/182* (2013.01); *H02P 6/085* (2013.01); *H02P 27/08* (2013.01)

(58) Field of Classification Search
CPC . H02P 9/12; H02P 9/123; H02P 9/126; H02K 23/14; H02K 23/16
USPC .................................................. 310/154.26
See application file for complete search history.

(56) References Cited

U.S. PATENT DOCUMENTS

| | | | | |
|---|---|---|---|---|
| 5,650,706 A * | 7/1997 | Yamada | ............... | B60L 11/1803 318/400.17 |
| 2002/0181137 A1 * | 12/2002 | Kimura | ..................... | H02P 6/08 360/73.03 |
| 2004/0100722 A1 * | 5/2004 | Kokami | ................... | G11B 5/54 360/75 |
| 2008/0100243 A1 * | 5/2008 | Kurosawa | .......... | G11B 19/2054 318/430 |
| 2013/0249459 A1 * | 9/2013 | Bauer | ..................... | H02P 6/182 318/400.35 |

* cited by examiner

*Primary Examiner* — Eduardo Colon Santana
*Assistant Examiner* — Bickey Dhakal
(74) *Attorney, Agent, or Firm* — McClure, Qualey & Rodack, LLP

(57) ABSTRACT

A driving method for a spindle motor and associated driving system and apparatus are provided. The driving method includes the following steps. Plural modulation signals and plural floating phases corresponding to the plural modulation signals are adjusted. A floating period comes immediately after an active period of each of the plural modulation signals according to the plural floating phases. During the floating period, a demagnetization time of the spindle motor is acquired according to a first terminal voltage signal at a first terminal of the spindle motor. If the demagnetization time is not smaller than the threshold time period, the step of adjusting the plural modulation signals is repeatedly done. Whereas, if the demagnetization time is smaller than the threshold time period, after the demagnetization time, a phase of the spindle motor is obtained according to the first terminal voltage signal.

16 Claims, 14 Drawing Sheets

DRIVING SYSTEM, APPARATUS AND METHOD FOR SPINDLE MOTOR

FIELD OF THE INVENTION

The invention relates to a driving system, apparatus and a driving method for a spindle motor, and more particularly to a driving system, apparatus and a driving method for a sensorless spindle motor.

BACKGROUND OF THE INVENTION

FIG. 1 schematically illustrates the architecture of a conventional spindle motor driving apparatus. As shown in FIG. 1, the conventional spindle motor driving apparatus connected to a spindle motor 130, and the spindle motor driving apparatus comprises a motor controller 110, a driving circuit 120, and a position sensor 140.

According to a rotating position of rotor of the spindle motor 130, the position sensor 140 generates a position signal H to the motor controller 110. According to the position signal H, the motor controller 110 generates a pulse width modulation signal PWM. According to the pulse width modulation signal PWM, the driving circuit 120 generates a first phase current Iu, a second phase current Iv and a third phase current Iw to three terminals U, V and W of the spindle motor 130. In response to the rotation of the spindle motor 130, the position sensor 140 issues the position signal H to the motor controller 110. For example, the position sensor 140 is a Hall sensor.

FIG. 2A is a schematic circuit diagram illustrating the driving circuit of the conventional spindle motor driving apparatus. As shown in FIG. 2A, the driving circuit 120 comprises six driving transistors M1~M6. Each of the driving transistors M1~M6 has a body diode connected between a drain terminal and a source terminal. Moreover, the pulse width modulation signal PWM comprises six modulation signals.

The gate terminal of the first driving transistor M1 receives the first modulation signal U_h. The drain terminal and the source terminal of the first driving transistor M1 are connected between a first power supply voltage V1 and a node u. The gate terminal of the second driving transistor M2 receives the second modulation signal W_I. The drain terminal and the source terminal of the second driving transistor M2 are connected between a second power supply voltage V2 and a node w. The gate terminal of the third driving transistor M3 receives the third modulation signal V_h. The drain terminal and the source terminal of the third driving transistor M3 are connected between the first power supply voltage V1 and a node v. The gate terminal of the fourth driving transistor M4 receives the fourth modulation signal U_I. The drain terminal and the source terminal of the fourth driving transistor M4 are connected between the second power supply voltage V2 and the node u. The gate terminal of the fifth driving transistor M5 receives the fifth modulation signal W_h. The drain terminal and the source terminal of the fifth driving transistor M5 are connected between the first power supply voltage V1 and the node w. The gate terminal of the sixth driving transistor M6 receives the sixth modulation signal V_I. The drain terminal and the source terminal of the sixth driving transistor M6 are connected between the second power supply voltage V2 and the node v. Moreover, the nodes u, v and w are connected to the three terminals U, V and W of the spindle motor 130, respectively.

FIG. 2B is a schematic timing waveform diagram illustrating the relationships between the pulse width modulation signal, the three phase signals and the position signal processed by the spindle motor driving apparatus of FIG. 1. The position signal H contains an A-component signal Ha, a B-component signal Hb and a C-component signal Hc.

In case that the phase of the rotor is in the range between 0 and 60 degrees, the first driving transistor M1 and the second driving transistor M2 are controlled by the first modulation signal U_h and the second modulation signal W_I, respectively. Under this circumstance, the first phase current Iu is positive, and the third phase current Iw is negative. That is, the driving current flows from the terminal U to the terminal W of the spindle motor 130. According to the A-component signal Ha, the B-component signal Hb and the C-component signal Hc, the position signal H indicative of (100) is obtained.

In case that the phase of the rotor is in the range between 60 and 120 degrees, the third driving transistor M3 and the second driving transistor M2 are controlled by the third modulation signal V_h and the second modulation signal W_I, respectively. Under this circumstance, the second phase current Iv is positive, and the third phase current Iw is negative. That is, the driving current flows from the terminal V to the terminal W of the spindle motor 130. According to the A-component signal Ha, the B-component signal Hb and the C-component signal Hc, the position signal H indicative of (110) is obtained.

In case that the phase of the rotor is in the range between 120 and 180 degrees, the third driving transistor M3 and the fourth driving transistor M4 are controlled by the third modulation signal V_h and the fourth modulation signal U_I, respectively. Under this circumstance, the second phase current Iv is positive, and the first phase current Iu is negative. That is, the driving current flows from the terminal V to the terminal U of the spindle motor 130. According to the A-component signal Ha, the B-component signal Hb and the C-component signal Hc, the position signal H indicative of (010) is obtained.

In case that the phase of the rotor is in the range between 180 and 240 degrees, the fifth driving transistor M5 and the fourth driving transistor M4 are controlled by the fifth modulation signal W_h and the fourth modulation signal U_I, respectively. Under this circumstance, the third phase current Iw is positive, and the first phase current Iu is negative. That is, the driving current flows from the terminal W to the terminal U of the spindle motor 130. According to the A-component signal Ha, the B-component signal Hb and the C-component signal Hc, the position signal H indicative of (011) is obtained.

In case that the phase of the rotor is in the range between 240 and 300 degrees, the fifth driving transistor M5 and the sixth driving transistor M6 are controlled by the fifth modulation signal W_h and the sixth modulation signal V_I, respectively. Under this circumstance, the third phase current Iw is positive, and the second phase current Iv is negative. That is, the driving current flows from the terminal W to the terminal V of the spindle motor 130. According to the A-component signal Ha, the B-component signal Hb and the C-component signal Hc, the position signal H indicative of (001) is obtained.

In case that the phase of the rotor is in the range between 300 and 360 degrees, the first driving transistor M1 and the sixth driving transistor M6 are controlled by the first modulation signal U_h and the sixth modulation signal V_I, respectively. Under this circumstance, the first phase current Iu is positive, and the second phase current Iv is negative.

That is, the driving current flows from the terminal U to the terminal V of the spindle motor 130. According to the A-component signal Ha, the B-component signal Hb and the C-component signal Hc, the position signal H indicative of (101) is obtained.

Then, the rotator is continuously rotated in the range between 0 and 360 degrees in cycles.

From the above discussions, each modulation signal of the pulse width modulation signal PWM has a 120-degree active period. For example, the active period of the first modulation signal U_h is in the range between 300 and 60 degrees, the active period of the second modulation signal W_I is in the range between 0 and 120 degrees, the active period of the third modulation signal V_h is in the range between 60 and 180 degrees, the active period of the fourth modulation signal U_I is in the range between 120 and 240 degrees, the active period of the fifth modulation signal W_h is in the range between 180 and 300 degrees, and the active period of the sixth modulation signal V_I is in the range between 240 and 360 degrees.

In other words, the motor controller 110 of the conventional spindle motor driving apparatus realizes the phase of the rotor of the spindle motor 130 according to the position signal H, and determines the 0-degree, 60-degree, 120-degree, 180-degree, 240-degree and 300-degree phase change points. Consequently, the active periods of the six modulation signals are correspondingly controlled. In case that the spindle motor driving apparatus has no position sensor to generate the position signal H, the motor controller 110 fails to accurately generate the six modulation signals U_h, U_I, V_h, V_I, W_h and W_I to control the spindle motor 130.

SUMMARY OF THE INVENTION

The invention provides a sensorless spindle motor driving system in order to reduce the cost and effectively control the spindle motor.

The invention provides a spindle motor driving apparatus connected to a first terminal, a second terminal and a third terminal of a spindle motor. The spindle motor driving apparatus comprises: a motor controller for generating plural modulation signals and plural floating phases corresponding to the plural modulation signals, wherein a floating period comes immediately after an active period of each of the plural modulation signals, wherein a first modulation signal of the plural modulation signals corresponds to a first floating phase of the plural floating phases; a driving circuit receiving the plural modulation signals, and generating a first terminal voltage signal to the first terminal, a second terminal voltage signal to the second terminal and a third terminal voltage signal to the third terminal; and a demagnetization measuring circuit connected to the first terminal, wherein at the first floating phase, the demagnetization measuring circuit measures a change of the first terminal voltage signal so as to calculate a demagnetization time of the spindle motor.

The invention also provides a method for driving a spindle motor. The spindle motor having a first terminal, a second terminal and a third terminal. The method comprising steps of: (a) adjusting plural modulation signals and plural floating phases corresponding to the plural modulation signals; (b) detecting a first floating period to come immediately after an active period of a first modulation signal of the plural modulation signals according to a first floating phase of the plural floating phases; (c) acquiring a demagnetization time according to a first terminal voltage signal at the first terminal of the spindle motor during the first floating period; and (d) selectively adjusting the first floating phase according to the demagnetization time.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

The invention provides a sensorless spindle motor driving system. In the sensorless spindle motor driving system, the phase change points are determined according to a back electromotive force (BEMF).

Figure 3A:
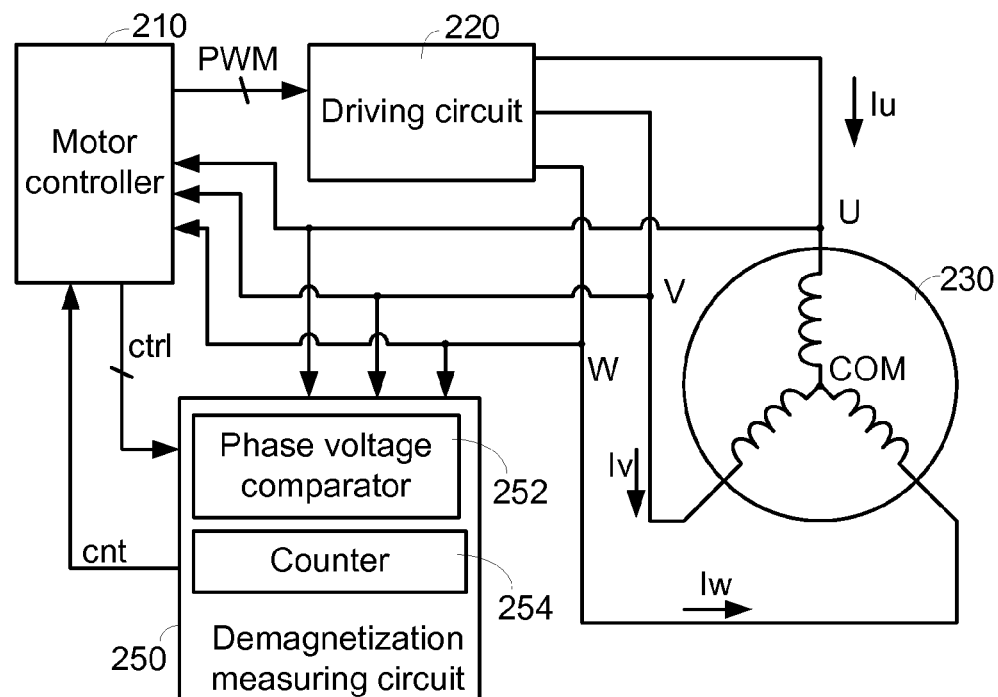
FIG. 3A schematically illustrates the architecture of a spindle motor driving apparatus according to an embodiment of the invention.

FIG. 3A schematically illustrates the architecture of a spindle motor driving apparatus according to an embodiment of the invention. As shown in FIG. 3A, the spindle motor driving apparatus connected to a spindle motor 230. The spindle motor driving apparatus comprises a motor controller 210, a driving circuit 220, and a demagnetization measuring circuit 250. Moreover, the demagnetization measuring circuit 250 comprises a phase voltage comparator 252 and a counter 254.

Figure 3B:
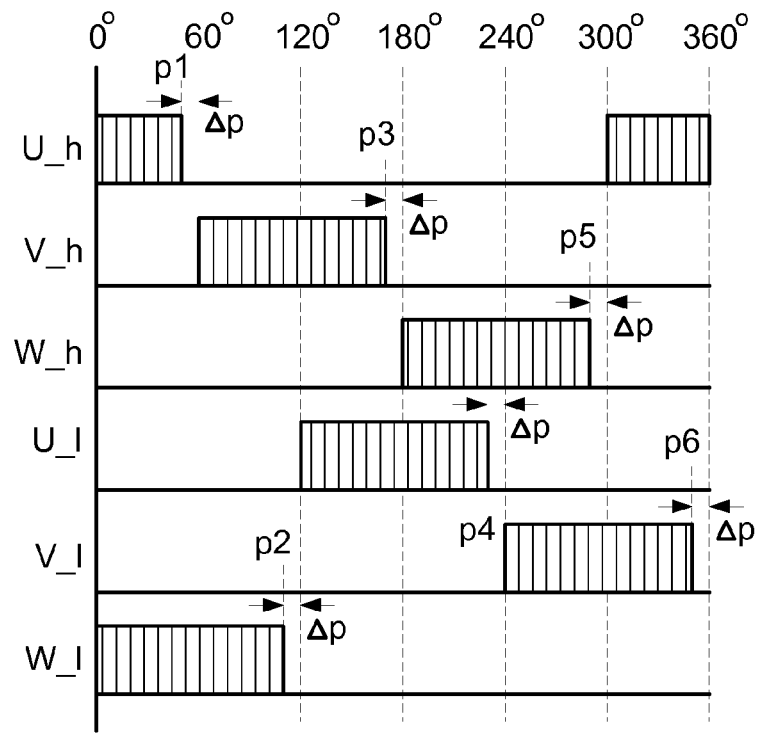
FIG. 3B is a schematic timing waveform diagram illustrating the relationships between the modulation signals of the pulse width modulation signal processed by the spindle motor driving apparatus of FIG. 3A.

FIG. 3B is a schematic timing waveform diagram illustrating the relationships between the modulation signals of the pulse width modulation signal processed by the spindle motor driving apparatus of FIG. 3A. In this embodiment, the motor controller 210 is capable of adjusting a floating phase, thereby dynamically adjusting a floating period $\Delta p$. As shown in FIG. 3B, the floating period $\Delta p$ comes immediately after the active period of each modulation signal. Consequently, the active period of each modulation signal is smaller than a 120-degree time period.

Please refer to FIG. 3B. Each of the time period from the floating phase p1 to 60 degrees, the time period from the floating phase p2 to 120 degrees, the time period from the floating phase p3 to 180 degrees, the time period from the floating phase p4 to 240 degrees, the time period from the floating phase p5 to 300 degrees and the time period from the floating phase p6 to 360 degrees indicates the floating period $\Delta p$.

Figure 1:
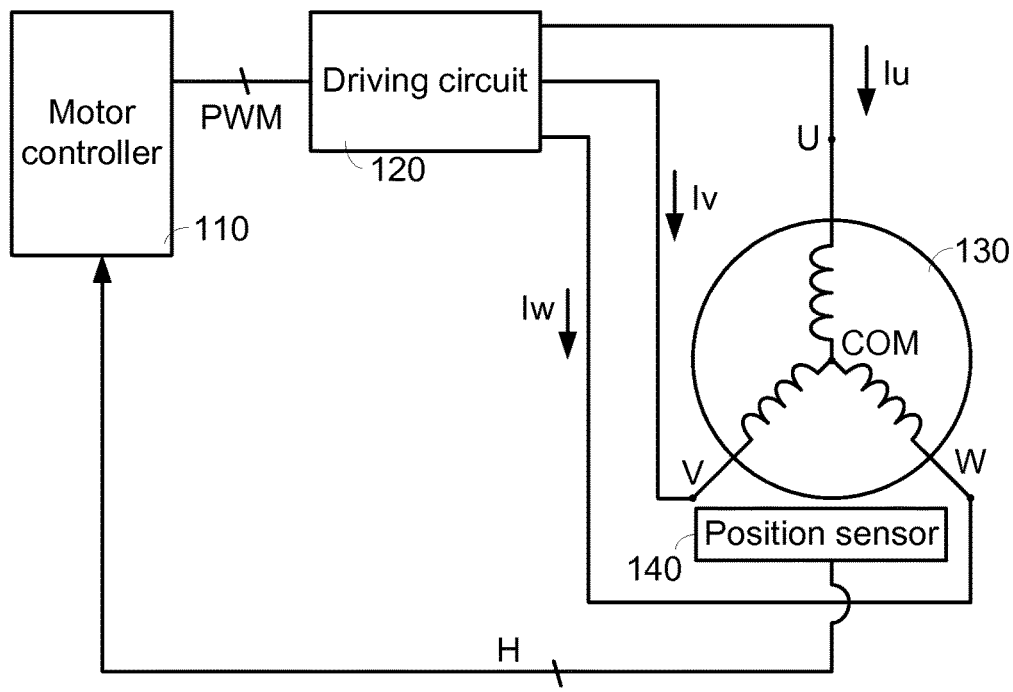
FIG. 1 (prior art) schematically illustrates the architecture of a conventional spindle motor driving apparatus.
Figure 2A:
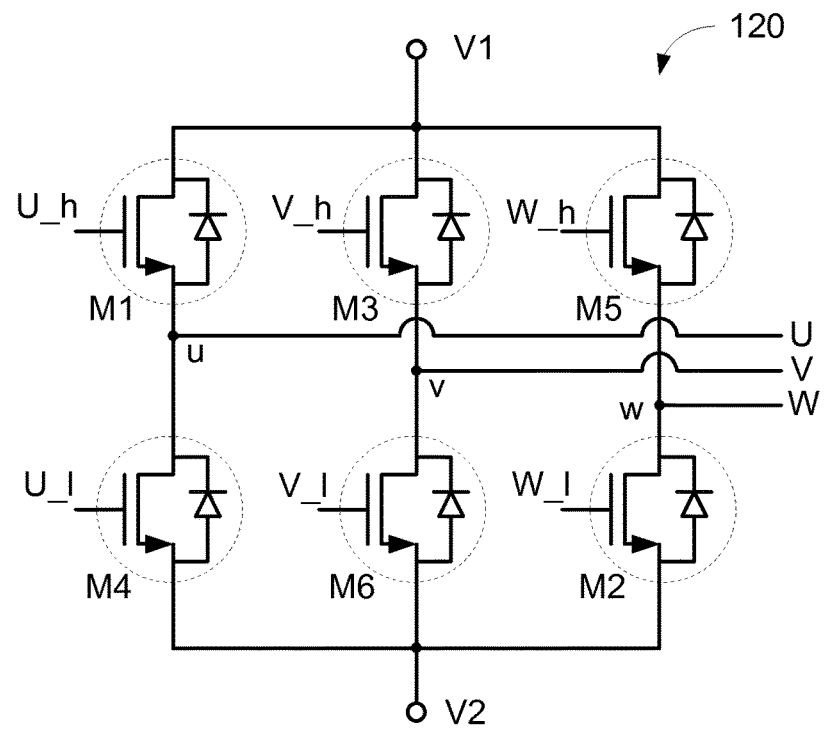
FIG. 2A (prior art) is a schematic circuit diagram illustrating the driving circuit of the conventional spindle motor driving apparatus.
Figure 2B:
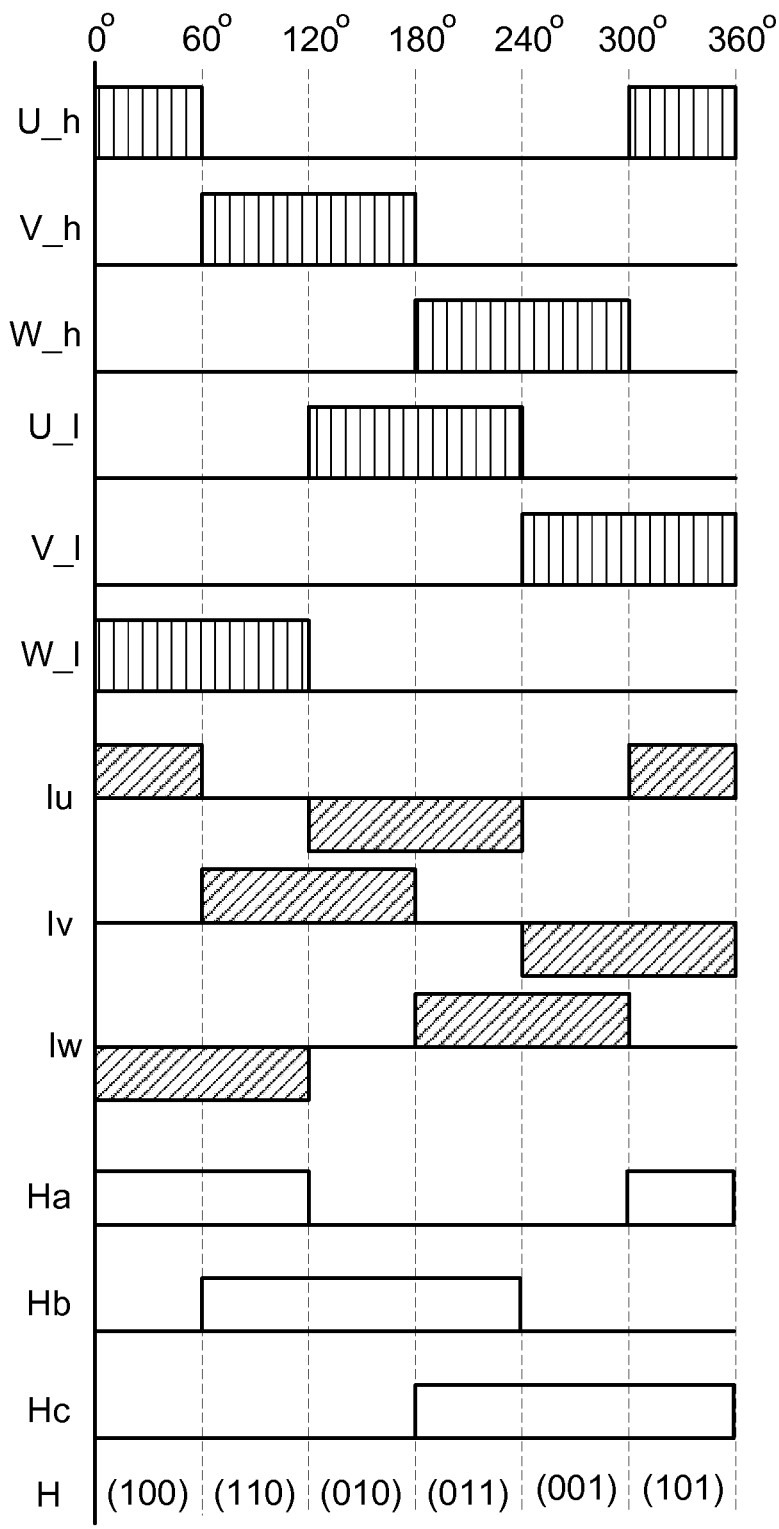
FIG. 2B (prior art) is a schematic timing waveform diagram illustrating the relationships between the pulse width modulation signal, the three phase signals and the position signal processed by the spindle motor driving apparatus of FIG. 1.

In accordance with a feature of the invention, the phase of the driving current for the spindle motor 230 is controlled by the motor controller 210 according to the floating period $\Delta p$. Consequently, the spindle motor 230 can be effectively controlled by the motor controller 210. The relationships between the driving transistors of the driving circuit 220 are identical to those of FIG. 2A, and are not redundantly described herein.

The operations of the spindle motor driving apparatus will be illustrated as follows. FIGS. 4A~4L schematically illustrate the relationships between the modulation signals and the driving current of the spindle motor driving apparatus according to the embodiment of the invention.

Figure 4A:
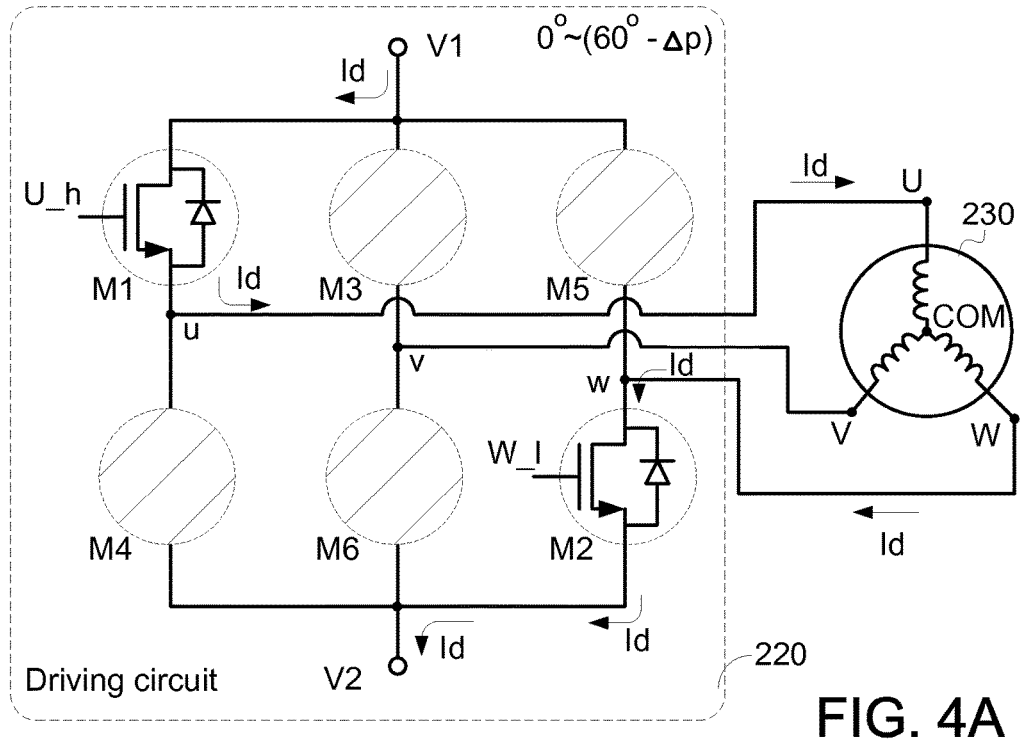
FIGS. 4A~4L schematically illustrate the relationships between the modulation signals and the driving current of the spindle motor driving apparatus according to the embodiment of the invention.

As shown in FIG. 4A, the phase of the rotor is in the range between 0 and $(60-\Delta p)$ degrees. That is, the phase of the rotor is within the active periods of the first modulation signal U_h and the second modulation signal W_I. Meanwhile, the driving current Id is transmitted from the first power supply voltage V1 to the terminal U of the spindle motor 230 through the first driving transistor M1 and the node u, and outputted from the terminal W of the spindle motor 230 to the second power supply voltage V2 through the node w and the second driving transistor M2.

Figure 4B:
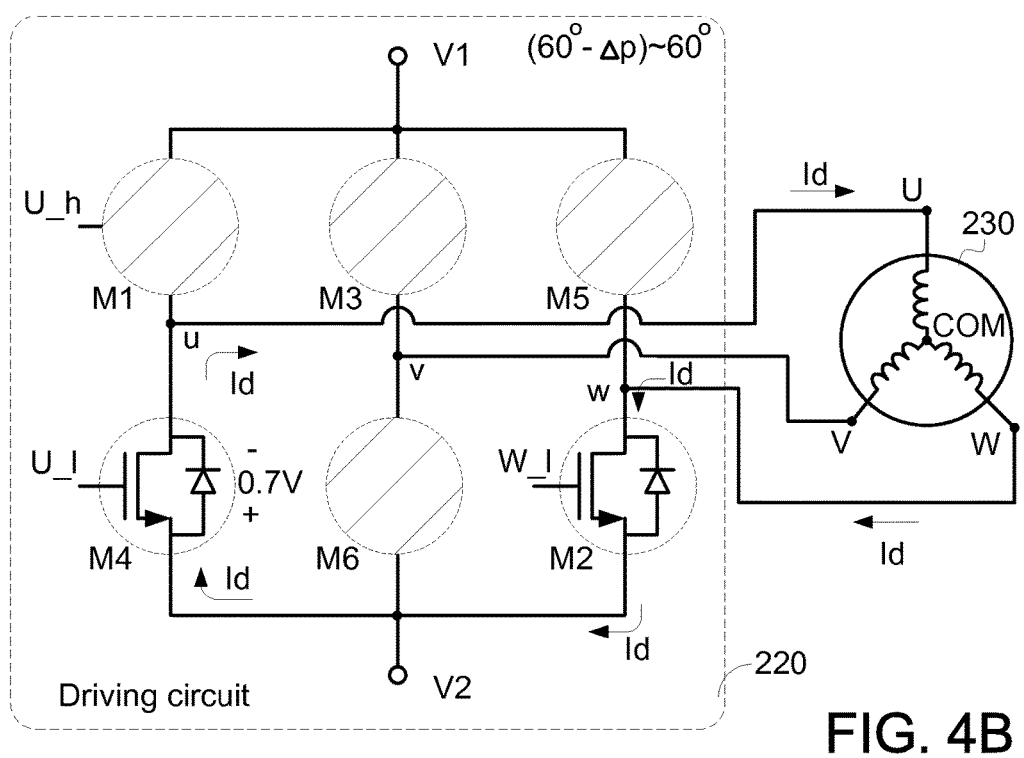

As shown in FIG. 4B, the phase of the rotor is in the floating period between $(60-\Delta p)$ and 60 degrees. That is, the phase of the rotor is within the active period of the second modulation signal W_I but not within the active period of the first modulation signal U_h. During the floating period, the driving current Id is still transmitted through the spindle motor 230 from the terminal U to the terminal W of the. Consequently, the body diode of the fourth driving transistor M4 is turned on, and a demagnetizing loop is formed. Under this circumstance, the driving current Id is transmitted from the terminal W to the terminal U of the spindle motor 230 through the node w, the second driving transistor M2, the body diode of the fourth driving transistor M4 and the node u.

During the floating period, the driving current Id is gradually decreased to zero. Consequently, the voltage at the terminal U of the spindle motor 230 is gradually increased from $(V2-0.7)$ to V2, wherein 0.7V is a forward bias voltage of the body diode. When the driving current Id is decreased to zero, the motor controller 210 starts detecting the back electromotive force (BEMF) of the terminal U and determines the phase of the spindle motor 230.

Figure 4C:
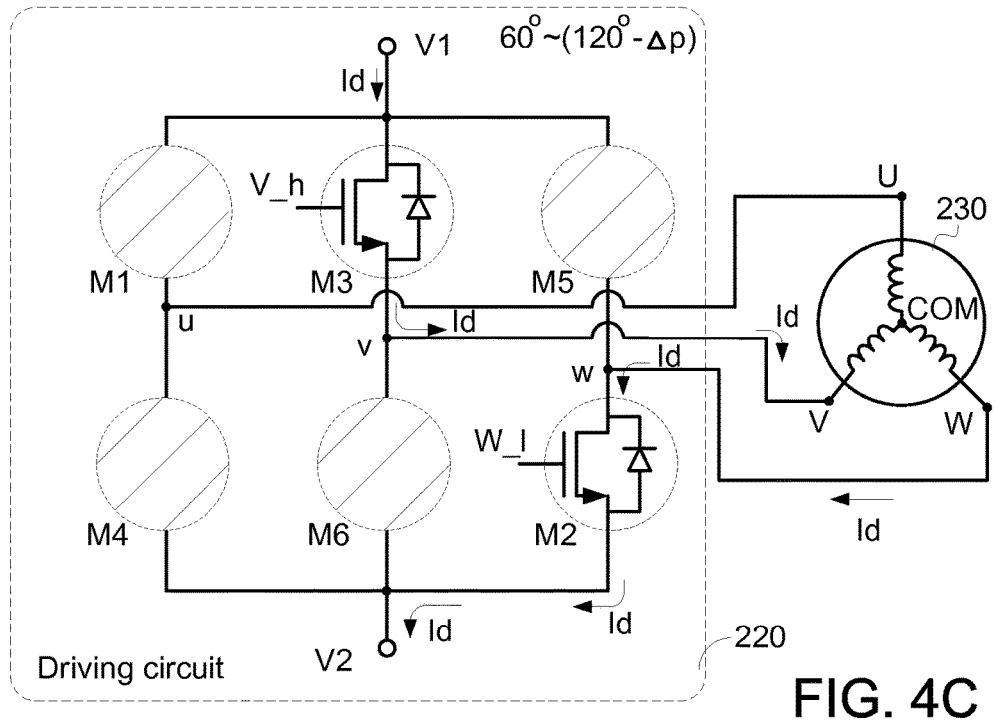

As shown in FIG. 4C, the phase of the rotor is in the range between 60 and $(120-\Delta p)$ degrees. That is, the phase of the rotor is within the active periods of the third modulation signal V_h and the second modulation signal W_I. Meanwhile, the driving current Id is transmitted from the first power supply voltage V1 to the terminal V of the spindle motor 230 through the third driving transistor M3 and the node v, and outputted from the terminal W of the spindle motor 230 to the second power supply voltage V2 through the node w and the second driving transistor M2.

Figure 4D:
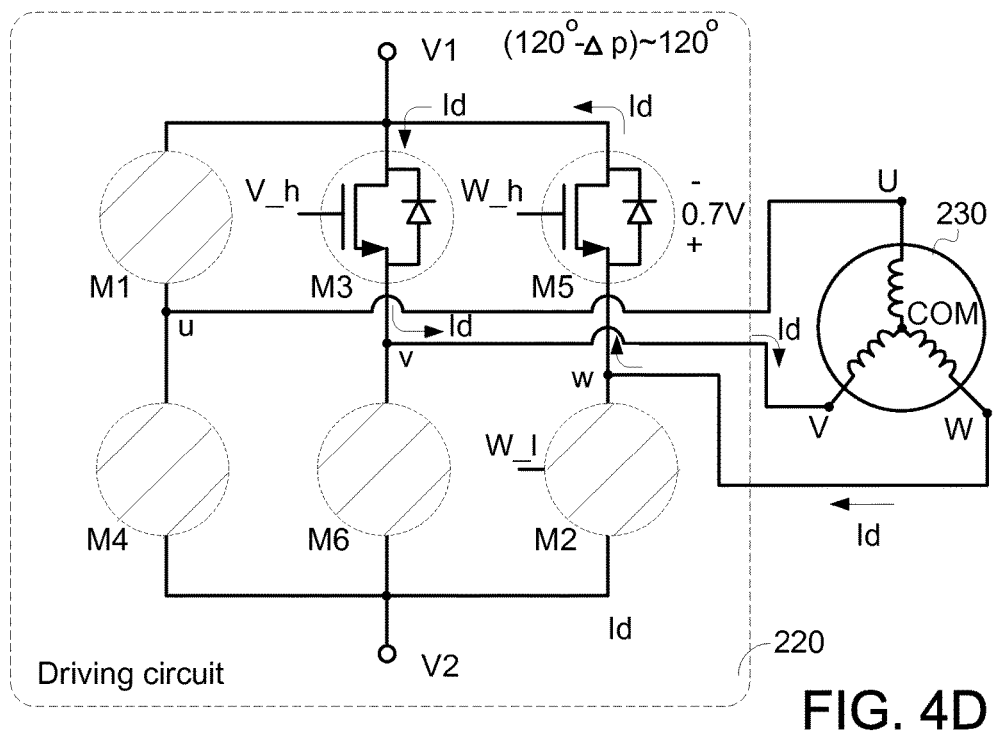

As shown in FIG. 4D, the phase of the rotor is in the floating period between $(120-\Delta p)$ and 120 degrees. That is, the phase of the rotor is within the active period of the third modulation signal V_h but not within the active period of the second modulation signal W_I. During the floating period, the driving current Id is still transmitted through the spindle motor 230 from the terminal V to the terminal W. Consequently, the body diode of the fifth driving transistor M5 is turned on, and a demagnetizing loop is formed. Under this circumstance, the driving current Id is transmitted from the terminal W to the terminal V of the spindle motor 230 through the node w, the body diode of the fifth driving transistor M5, the third driving transistor M3 and the node v.

During the floating period, the driving current Id is gradually decreased to zero. Consequently, the voltage at the terminal W of the spindle motor 230 is gradually decreased from $(V1+0.7)$ to V1, wherein 0.7V is a forward bias voltage of the body diode. When the driving current Id is decreased to zero, the motor controller 210 starts detecting the back electromotive force (BEMF) of the terminal W and determines the phase of the spindle motor 230.

Figure 4E:
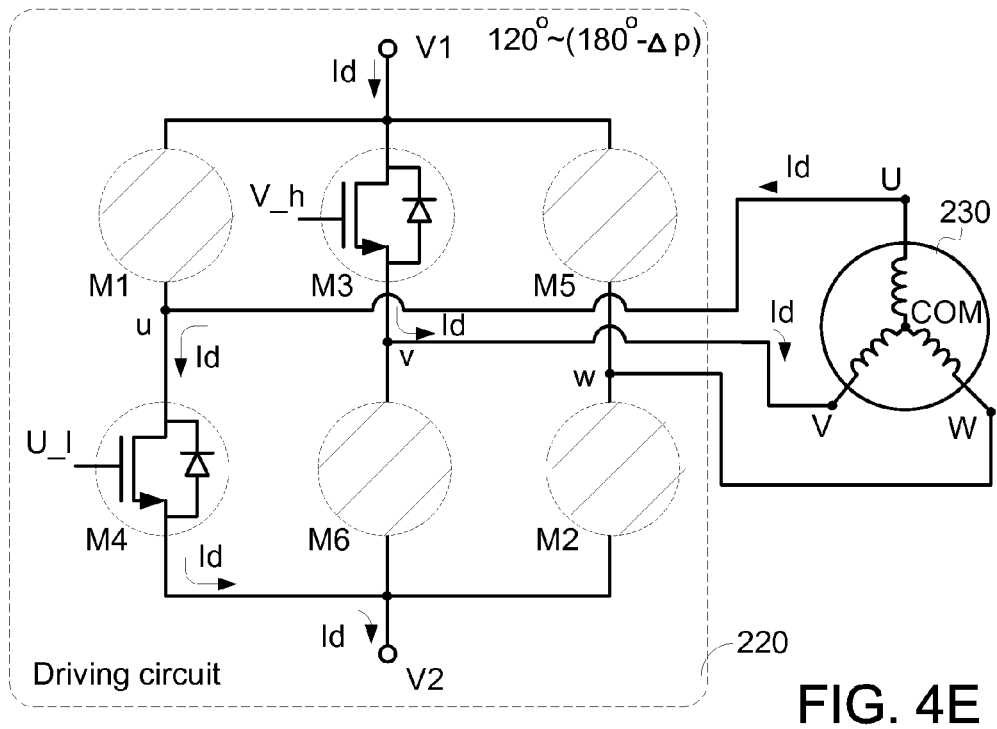

As shown in FIG. 4E, the phase of the rotor is in the range between 120 and $(180-\Delta p)$ degrees. That is, the phase of the rotor is within the active periods of the third modulation signal V_h and the fourth modulation signal U_I. Meanwhile, the driving current Id is transmitted from the first power supply voltage V1 to the terminal V of the spindle motor 230 through the third driving transistor M3 and the node v, and outputted from the terminal U of the spindle motor 230 to the second power supply voltage V2 through the node u and the fourth driving transistor M4.

Figure 4F:
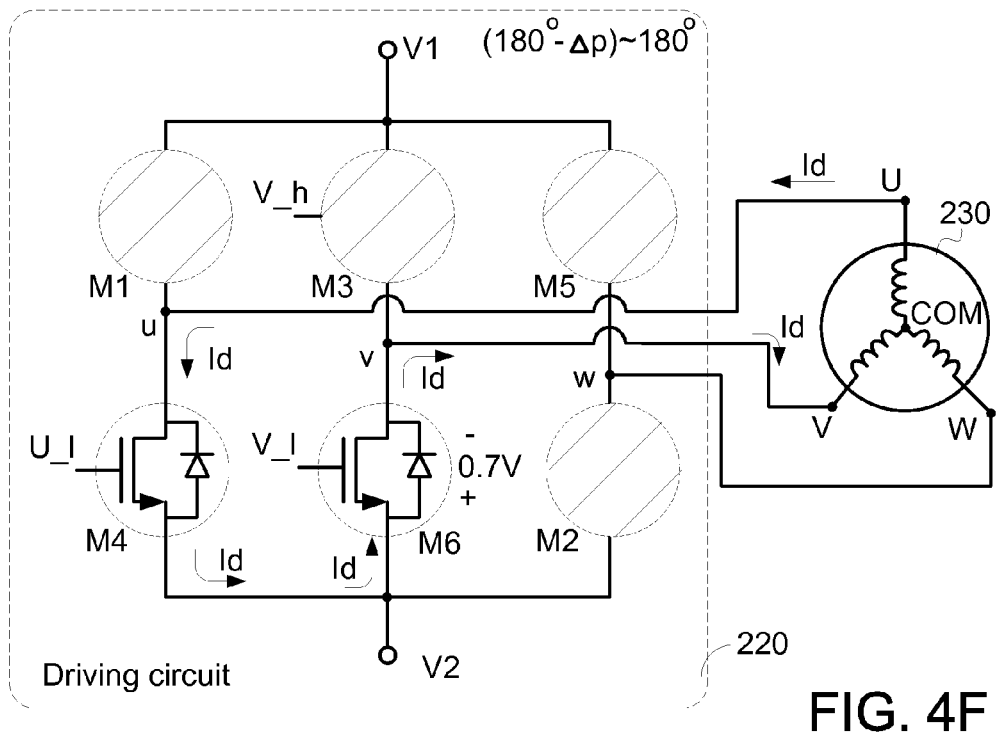

As shown in FIG. 4F, the phase of the rotor is in the floating period between $(180-\Delta p)$ and 180 degrees. That is, the phase of the rotor is within the active period of the fourth modulation signal U_I but not within the active period of the third modulation signal V_h. During the floating period, the driving current Id is still transmitted through the spindle motor 230 from the terminal V to the terminal U. Consequently, the body diode of the sixth driving transistor M6 is turned on, and a demagnetizing loop is formed. Under this circumstance, the driving current Id is transmitted from the terminal U to the terminal V of the spindle motor 230 through the node u, the fourth driving transistor M4, the body diode of the sixth driving transistor M6 and the node v.

During the floating period, the driving current Id is gradually decreased to zero. Consequently, the voltage at the terminal V of the spindle motor 230 is gradually increased from $(V2-0.7)$ to V2, wherein 0.7V is a forward bias voltage of the body diode. When the driving current Id is decreased to zero, the motor controller 210 starts detecting the back electromotive force (BEMF) of the terminal V and determines the phase of the spindle motor 230.

Figure 4G:
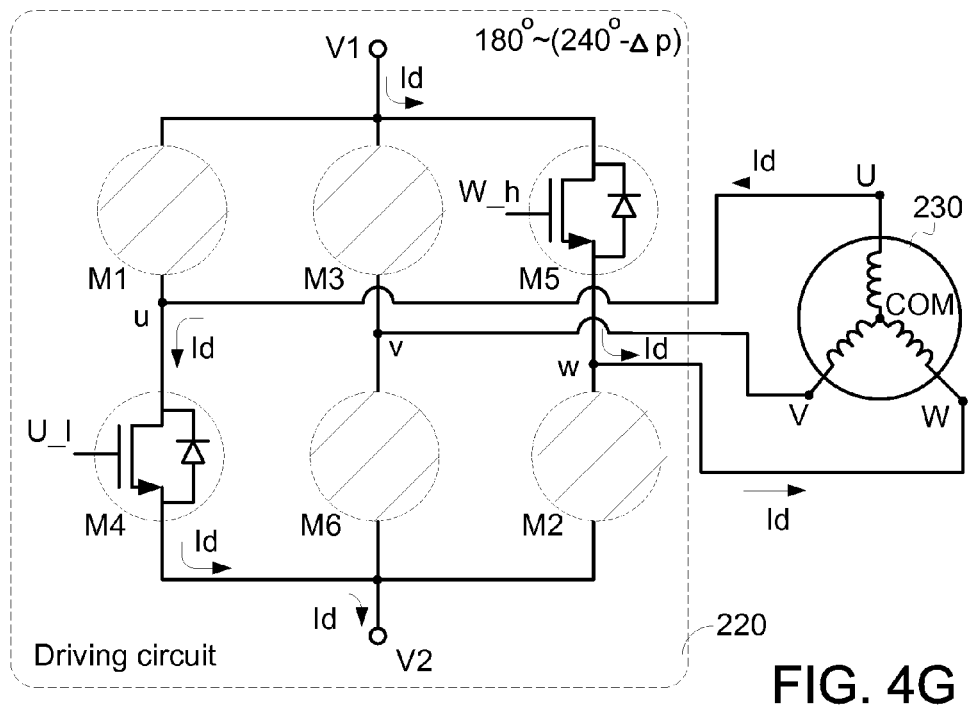

As shown in FIG. 4G, the phase of the rotor is in the range between 180 and (240−Δp) degrees. That is, the phase of the rotor is within the active periods of the fifth modulation signal W_h and the fourth modulation signal U_I. Meanwhile, the driving current Id is transmitted from the first power supply voltage V1 to the terminal W of the spindle motor 230 through the fifth driving transistor M5 and the node w, and outputted from the terminal U of the spindle motor 230 to the second power supply voltage V2 through the node u and the fourth driving transistor M4.

Figure 4H:
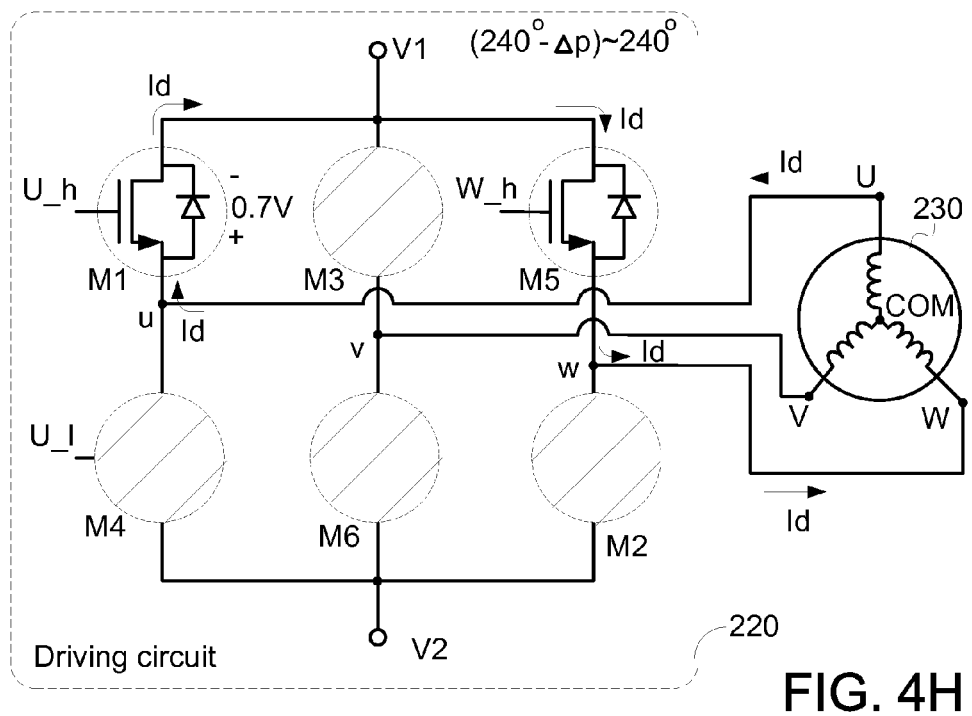

As shown in FIG. 4H, the phase of the rotor is in the floating period between (240−Δp) and 240 degrees. That is, the phase of the rotor is within the active period of the fifth modulation signal W_h but not within the active period of the fourth modulation signal U_I. During the floating period, the driving current Id is still transmitted through the spindle motor 230 from the terminal W to the terminal U. Consequently, the body diode of the first driving transistor M1 is turned on, and a demagnetizing loop is formed. Under this circumstance, the driving current Id is transmitted from the terminal U to the terminal W of the spindle motor 230 through the node u, the body diode of the first driving transistor M1, the fifth driving transistor M5 and the node w.

During the floating period, the driving current Id is gradually decreased to zero. Consequently, the voltage at the terminal U of the spindle motor 230 is gradually decreased from (V1+0.7) to V1, wherein 0.7V is a forward bias voltage of the body diode. When the driving current Id is decreased to zero, the motor controller 210 starts detecting the back electromotive force (BEMF) of the terminal U and determines the phase of the spindle motor 230.

Figure 4I:
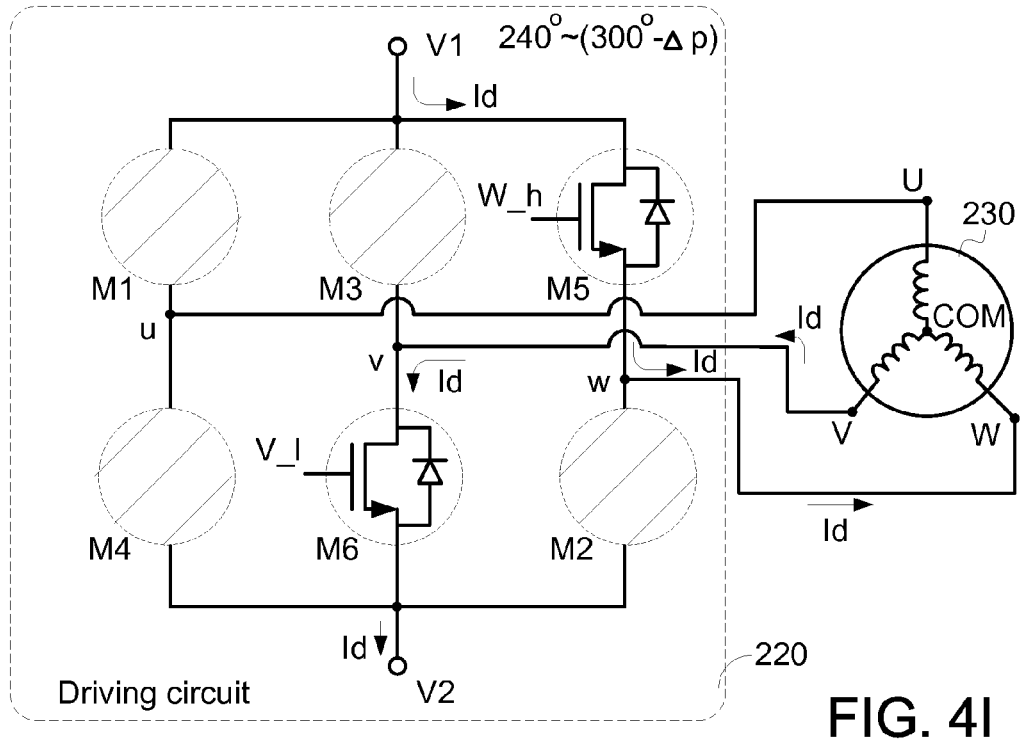

As shown in FIG. 4I, the phase of the rotor is in the range between 240 and (300−Δp) degrees. That is, the phase of the rotor is within the active periods of the fifth modulation signal W_h and the sixth modulation signal V_I. Meanwhile, the driving current Id is transmitted from the first power supply voltage V1 to the terminal W of the spindle motor 230 through the fifth driving transistor M5 and the node w, and outputted from the terminal V of the spindle motor 230 to the second power supply voltage V2 through the node v and the sixth driving transistor M6.

Figure 4J:
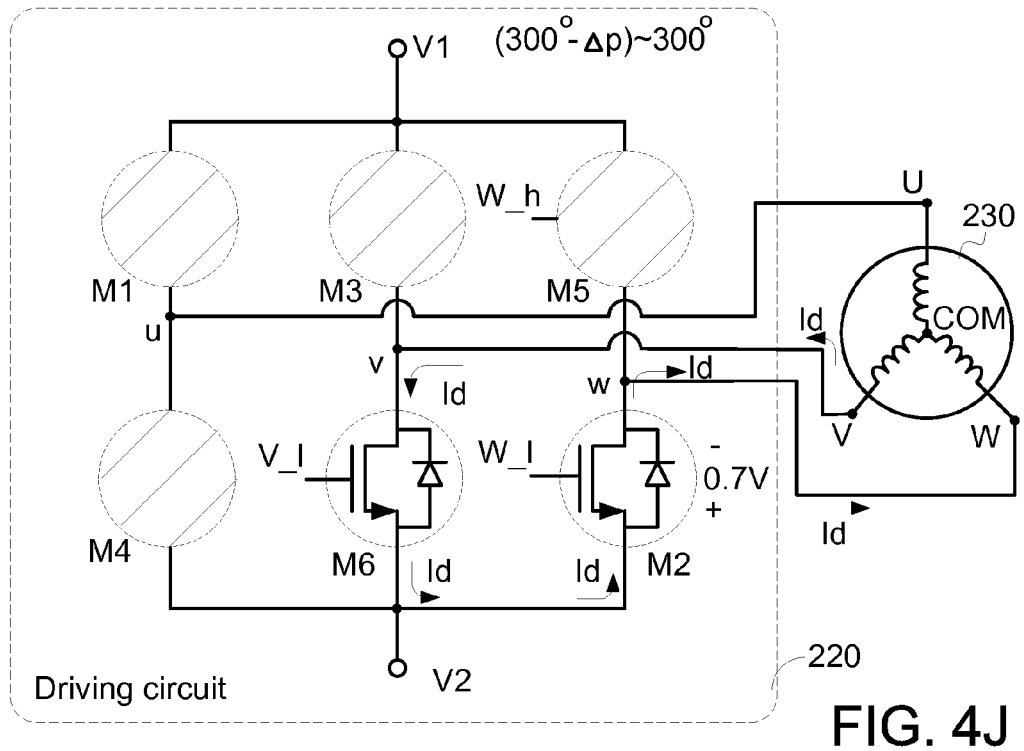

As shown in FIG. 4J, the phase of the rotor is in the floating period between (300−Δp) and 300 degrees. That is, the phase of the rotor is within the active period of the sixth modulation signal V_I but not within the active period of the fifth modulation signal W_h. During the floating period, the driving current Id is still transmitted through the spindle motor 230 from the terminal W to the terminal V. Consequently, the body diode of the second driving transistor M2 is turned on, and a demagnetizing loop is formed. Under this circumstance, the driving current Id is transmitted from the terminal V to the terminal W of the spindle motor 230 through the node v, the sixth driving transistor M6, the body diode of the second driving transistor M2 and the node w.

During the floating period, the driving current Id is gradually decreased to zero. Consequently, the voltage at the terminal W of the spindle motor 230 is gradually increased from (V2−0.7) to V2, wherein 0.7V is a forward bias voltage of the body diode. When the driving current Id is decreased to zero, the motor controller 210 starts detecting the back electromotive force (BEMF) of the terminal W and determines the phase of the spindle motor 230.

Figure 4K:
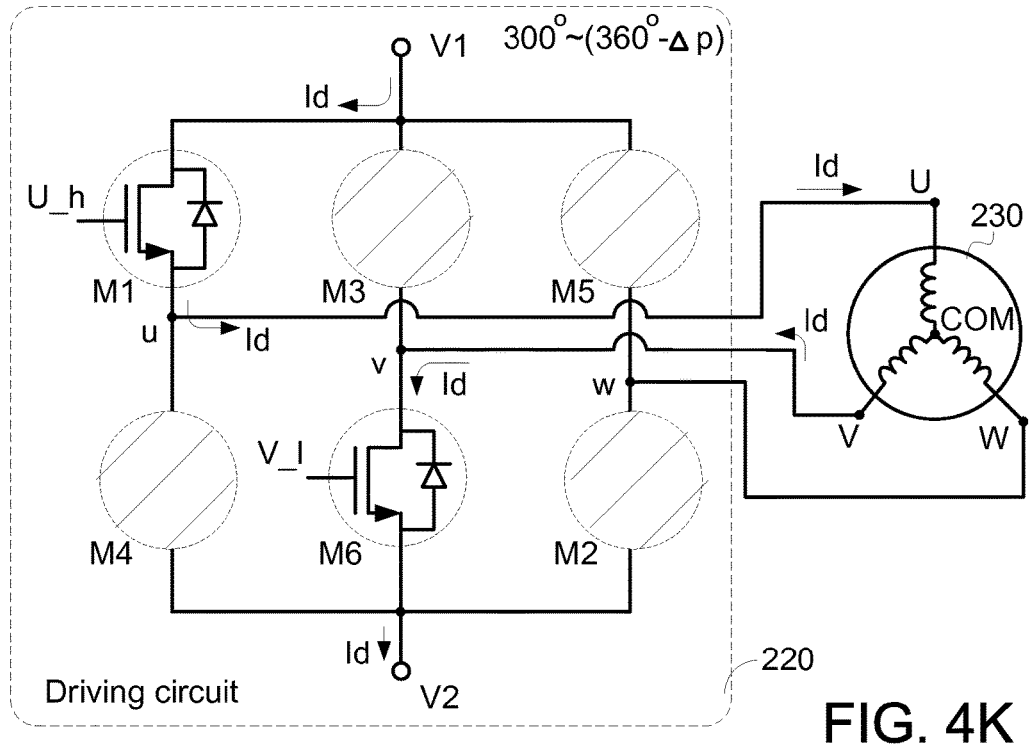

As shown in FIG. 4K, the phase of the rotor is in the range between 300 and (360−Δp) degrees. That is, the phase of the rotor is within the active periods of the first modulation signal U_h and the sixth modulation signal V_I. Meanwhile, the driving current Id is transmitted from the first power supply voltage V1 to the terminal U of the spindle motor 230 through the first driving transistor M1 and the node u, and outputted from the terminal V of the spindle motor 230 to the second power supply voltage V2 through the node v and the sixth driving transistor M6.

Figure 4L:
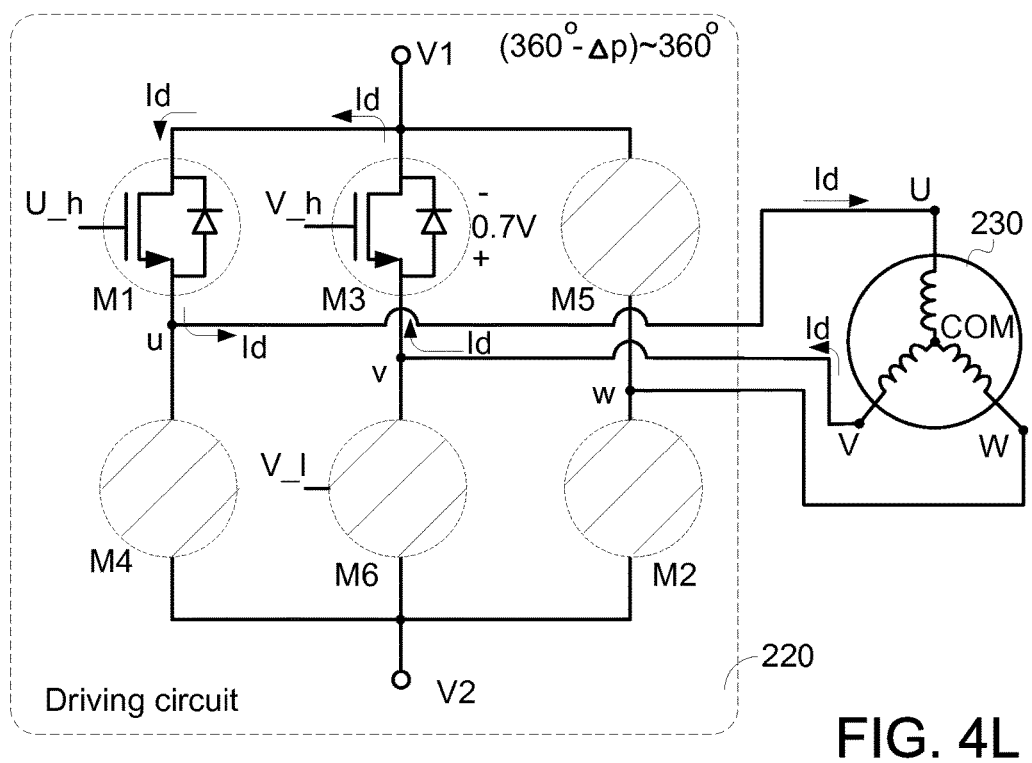

As shown in FIG. 4L, the phase of the rotor is in the floating period between (360−Δp) and 360 degrees. That is, the phase of the rotor is within the active period of first modulation signal U_h but not within the active period of the sixth modulation signal V_I. During the floating period, the driving current Id is still transmitted through the spindle motor 230 from the terminal U to the terminal V. Consequently, the body diode of the third driving transistor M3 is turned on, and a demagnetizing loop is formed. Under this circumstance, the driving current Id is transmitted from the terminal V to the terminal U of the spindle motor 230 through the node v, the body diode of the third driving transistor M3, the first driving transistor M1 and the node u.

During the floating period, the driving current Id is gradually decreased to zero. Consequently, the voltage at the terminal V of the spindle motor 230 is gradually decreased from (V1+0.7) to V1, wherein 0.7V is a forward bias voltage of the body diode. When the driving current Id is decreased to zero, the motor controller 210 starts detecting the back electromotive force (BEMF) of the terminal V and determines the phase of the spindle motor 230.

After the above processes of FIGS. 4A~4L are sequentially performed, all phases of the spindle motor 230 are detected.

Generally, the magnitude of the driving current Id is determined according to the load condition and the rotating speed of the spindle motor. That is, the magnitude of the driving current Id is influenced by three factors, including the type of the spindle motor, the load condition and the rotating speed. In case that the magnitude of the driving current Id is different, the delay time of generating the back electromotive force (BEMF) is different.

Figure 5:
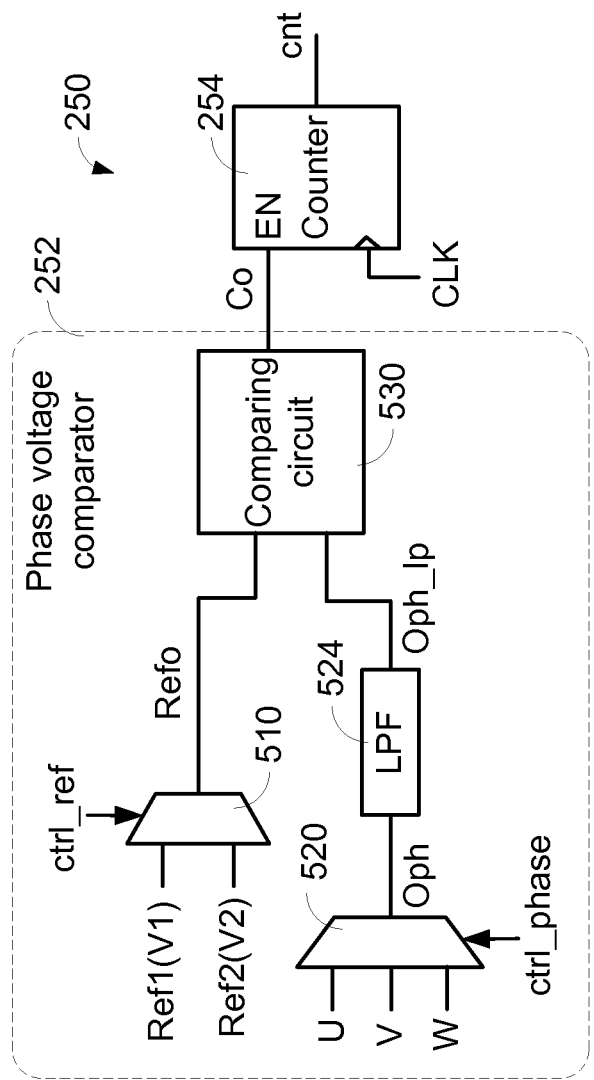
FIG. 5 is a schematic circuit block diagram illustrating a first exemplary demagnetization measuring circuit of the spindle motor driving apparatus according to the embodiment of the invention.

FIG. 5 is a schematic circuit block diagram illustrating a first exemplary demagnetization measuring circuit of the spindle motor driving apparatus according to the embodiment of the invention. The demagnetization measuring circuit 250 comprises the phase voltage comparator 252 and the counter 254. The phase voltage comparator 252 comprises a first multiplexer 510, a second multiplexer 520, a low pass filter (LPF) 524, and a comparing circuit 530. The control signal ctrl outputted from the motor controller 210 comprises a reference control signal ctrl_ref and a phase control signal ctrl_phase.

The first multiplexer 510 receives a first reference voltage Ref1 and a second reference voltage Ref2, and selects one of the first reference voltage Ref1 and the second reference voltage Ref2 as an output reference voltage Refo according to the reference control signal ctrl_ref. In an embodiment, the first reference voltage Ref1 is the first power supply voltage V1, and the second reference voltage Ref2 is the second power supply voltage V2.

The second multiplexer 520 is connected with the terminal U, the terminal V and the terminal W. According to the phase control signal ctrl_phase, the second multiplexer 520 selects one of the voltage signals from the terminal U, the terminal V and the terminal W as an output phase signal Oph. After the output phase signal Oph is processed by the low pass filter (LPF) 524, a filtered output phase signal Oph_Ip is generated.

By comparing the output reference voltage Refo with the filtered output phase signal Oph_Ip, the comparing circuit 530 generates a comparing signal Co. Moreover, the counter 254 receives a clock signal CLK. The comparing signal Co enters an enabling terminal EN of the counter 254. According to the clock signal CLK, the time period of enabling the counter 254 is counted and a count value cnt is outputted from the counter 254.

Figure 6A:
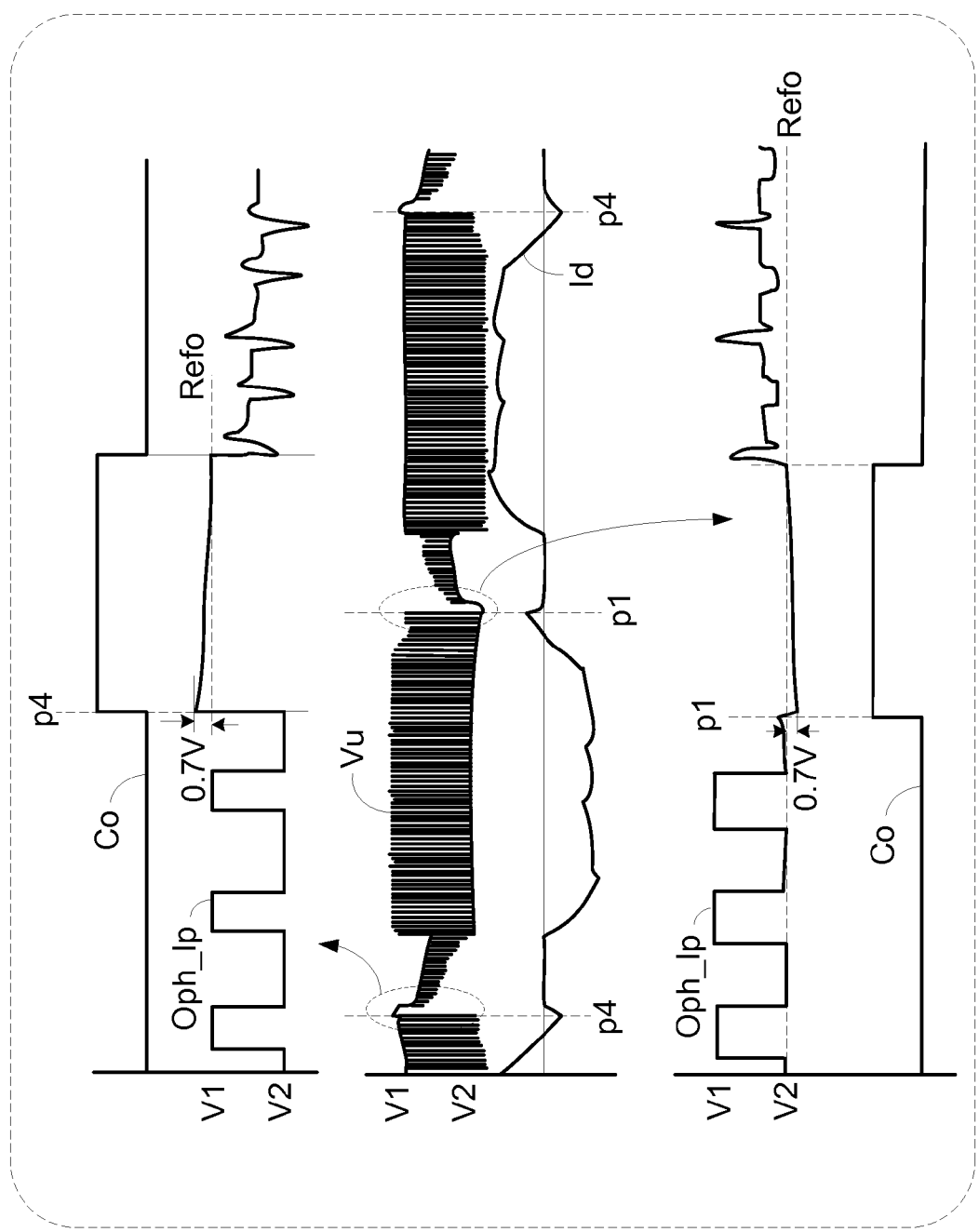
FIG. 6A is a schematic timing waveform diagram illustrating associated signals of adjusting the floating phases to an unideal status by the motor controller.

FIG. 6A is a timing waveform diagram illustrating associated signals of adjusting the floating phases to an unideal status by the motor controller. In case that the floating phases p1 and p4 are adjusted to the unideal status, the driving currents Id corresponding to the floating phases p1 and p4 are non-smooth. Due to the non-smooth driving current Id, the rotation of the spindle motor 230 generates noise and a longer demagnetization time is required.

In FIG. 6A, the change of the voltage signal Vu at the terminal U is illustrated. It is noted that the change of the voltage signal Vv at the terminal V or the change of the voltage signal Vw at the terminal W may be deduced by analogy. Moreover, the voltage signal Vu at the terminal U is selected as the filtered output phase signal Oph_Ip according to the phase control signal ctrl_phase from the motor controller 210.

At the floating phase p4, the first reference voltage Ref1, e.g. V1, is selected as the output reference voltage Refo according to the reference control signal ctrl_ref from the motor controller 210. Consequently, at the floating phase p4, the filtered output phase signal Oph_Ip is equal to (V1+0.7). Under this circumstance, the comparing signal Co from the comparing circuit 530 is in a high-level state. When the filtered output phase signal Oph_Ip is decreased to V1, the comparing signal Co from the comparing circuit 530 is in a low-level state. In other words, the pulse width of the comparing signal Co is the demagnetization time of the spindle motor 230. Moreover, the demagnetization time is transformed into the count value cnt by the counter 254.

Similarly, at the floating phase p1, the second reference voltage Ref2, e.g. V2, is selected as the output reference voltage Refo according to the reference control signal ctrl_ref from the motor controller 210. Consequently, at the floating phase p1, the filtered output phase signal Oph_Ip is equal to (V2−0.7). Under this circumstance, the comparing signal Co from the comparing circuit 530 is in the high-level state. When the filtered output phase signal Oph_Ip is increased to V2, the comparing signal Co from the comparing circuit 530 is in the low-level state. In other words, the pulse width of the comparing signal Co is the demagnetization time of the spindle motor 230. Moreover, the demagnetization time is transformed into the count value cnt by the counter 254.

When the comparing signal Co is in the low-level state, the demagnetization time is ended. At this moment, the voltage signal Vu at the terminal U of the spindle motor 230 is the back electromotive force (BEMF). According to the back electromotive force (BEMF), the phase of the spindle motor 230 is detected by the motor controller 210.

Figure 6B:
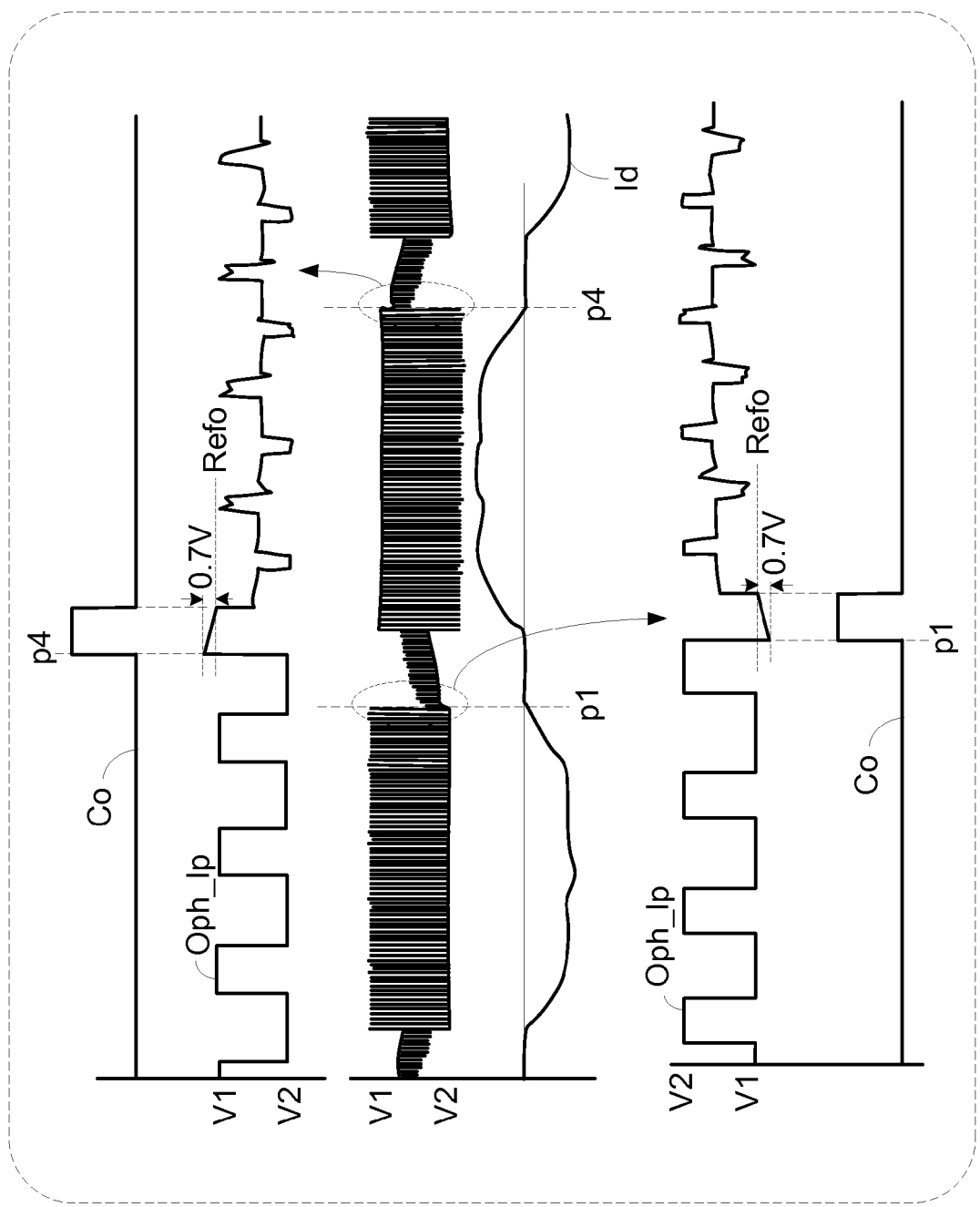
FIG. 6B is a schematic timing waveform diagram illustrating associated signals of adjusting the floating phases to an ideal status by the motor controller.

FIG. 6B is a timing waveform diagram illustrating associated signals of adjusting the floating phases to an ideal status by the motor controller. In case that the floating phases p1 and p4 are adjusted to the ideal status, the driving currents Id corresponding to the floating phases p1 and p4 are smooth. Due to the smooth driving current Id, the rotation of the spindle motor 230 is smoother. Consequently, the noise is reduced, and the demagnetization time is shortened.

At the floating phase p4, the first reference voltage Ref1, e.g. V1, is selected as the output reference voltage Refo according to the reference control signal ctrl_ref from the motor controller 210. Consequently, at the floating phase p4, the filtered output phase signal Oph_Ip is equal to (V1+0.7). Under this circumstance, the comparing signal Co from the comparing circuit 530 is in a high-level state. When the filtered output phase signal Oph_Ip is decreased to V1, the comparing signal Co from the comparing circuit 530 is in a low-level state. In other words, the pulse width of the comparing signal Co is the demagnetization time of the spindle motor 230. Moreover, the demagnetization time is transformed into the count value cnt by the counter 254.

Similarly, at the floating phase p1, the second reference voltage Ref2, e.g. V2, is selected as the output reference voltage Refo according to the reference control signal ctrl_ref from the motor controller 210. Consequently, at the floating phase p1, the filtered output phase signal Oph_Ip is equal to (V2−0.7). Under this circumstance, the comparing signal Co from the comparing circuit 530 is in the high-level state. When the filtered output phase signal Oph_Ip is increased to V2, the comparing signal Co from the comparing circuit 530 is in the low-level state. In other words, the pulse width of the comparing signal Co is the demagnetization time of the spindle motor 230. Moreover, the demagnetization time is transformed into the count value cnt by the counter 254.

When the comparing signal Co is in the low-level state, the demagnetization time is ended. At this moment, the voltage signal Vu at the terminal U of the spindle motor 230 is the back electromotive force (BEMF). According to the back electromotive force (BEMF), the phase of the spindle motor 230 is detected by the motor controller 210.

From the above discussions, when the floating phase is adjusted to the unideal status by the motor controller 210, the demagnetization time is longer and the count value cnt outputted from the demagnetization measuring circuit 250 is larger. On the other hand, when the floating phase is adjusted to the ideal status by the motor controller 210, the demagnetization time is shorter and the count value cnt outputted from the demagnetization measuring circuit 250 is smaller. In case that the demagnetization time is shorter than a threshold time period (e.g. 2 μs), it is considered that the floating phase is adjusted to the unideal status.

Figure 7:
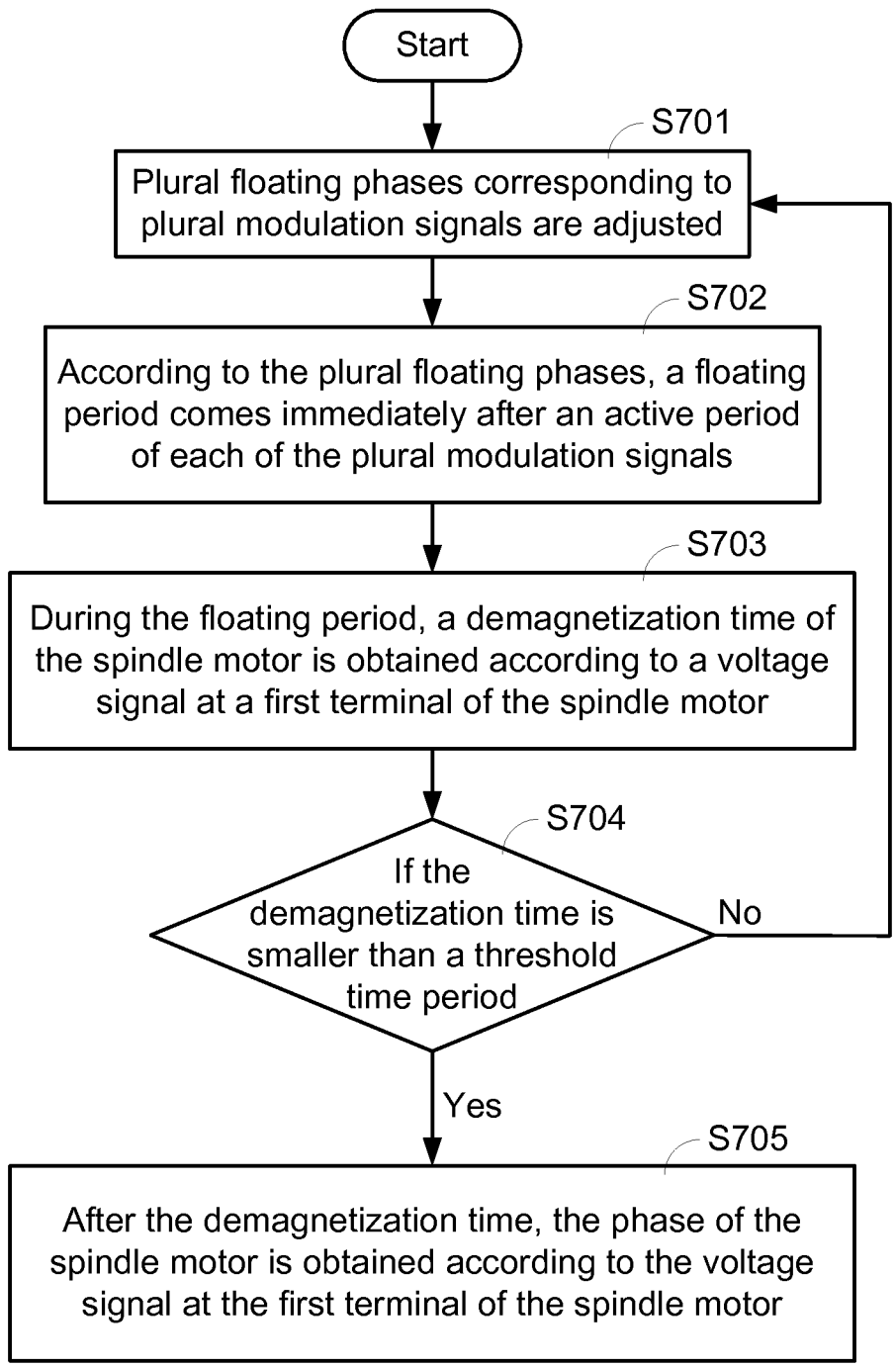
FIG. 7 is a flowchart illustrating a spindle motor driving method for the spindle motor driving apparatus according to the embodiment of the invention.

FIG. 7 is a flowchart illustrating a spindle motor driving method for the spindle motor driving apparatus according to the embodiment of the invention.

Firstly, plural floating phases corresponding to plural modulation signals are adjusted (Step S701). According to the plural floating phases, a floating period comes immediately after an active period of each of the plural modulation signals (Step S702). During the floating period, a demagnetization time of the spindle motor is obtained according to a voltage signal at a first terminal of the spindle motor (Step S703).

If the demagnetization time is not smaller than a threshold time period (Step S704), the step S701 of adjusting the plural floating phases corresponding to the plural modulation signals is repeatedly done. Whereas, if the demagnetization time is smaller than the threshold time period (Step S704), after the demagnetization time, the phase of the spindle motor is obtained according to the voltage signal at the first terminal of the spindle motor (Step S705).

After the rotation of the spindle motor reaches balance, it is enough to detect the demagnetization time corresponding to a specified floating phase. Under this circumstance, it is not necessary to receive the control signal ctrl of the motor controller 210, and the circuitry of the demagnetization measuring circuit 250 is simplified. Hereinafter, the connection between the terminal U of the spindle motor 230 and the demagnetization measuring circuit 250 will be illustrated. It should be noted that the connection between the terminal V or the terminal W of the spindle motor 230 and the demagnetization measuring circuit 250 may be deduced by analogy.

That is to say, after the rotation of the spindle motor reaches balance, a first floating period to come immediately after an active period of a first modulation signal is detected according to a first floating phase. Then, a demagnetization time according to a first terminal voltage signal at the first terminal of the spindle motor during the first floating period is detected. And then, the first floating phase is selectively adjusted according to the demagnetization time.

Figure 8A:
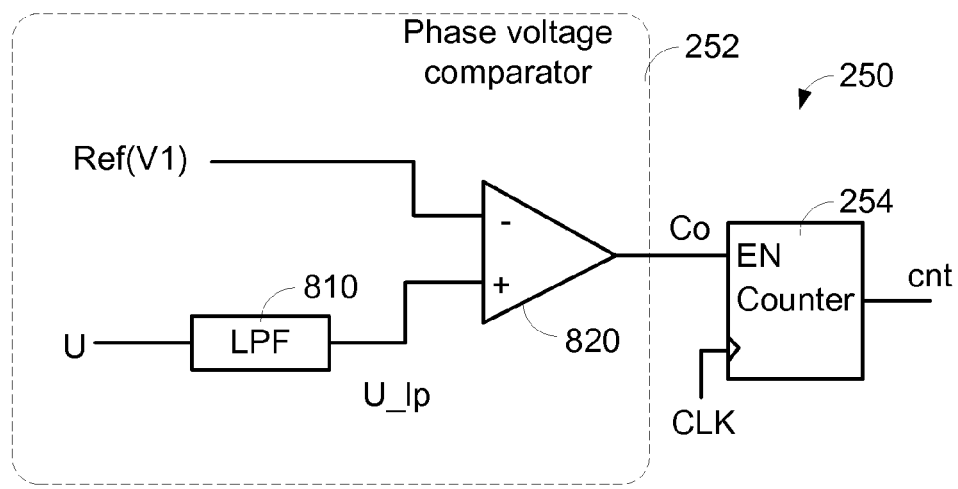
FIG. 8A is a schematic circuit block diagram illustrating a second exemplary demagnetization measuring circuit of the spindle motor driving apparatus according to the embodiment of the invention.

FIG. 8A is a circuit block diagram illustrating a second exemplary demagnetization measuring circuit of the spindle motor driving apparatus according to an embodiment of the invention. The demagnetization measuring circuit 250 comprises the phase voltage comparator 252 and the counter 254. The phase voltage comparator 252 comprises a low pass filter (LPF) 810 and a comparing circuit 820. The low pass filter 810 is connected with the terminal U for generating a filtered U-terminal voltage signal U_Ip. Moreover, a negative input end (−) of the comparing circuit 820 receives a reference voltage Ref, e.g. the first power supply voltage V1, and a positive input end (+) of the comparing circuit 820 receives the filtered U-terminal voltage signal U_Ip.

At the floating phase p4, the filtered U-terminal voltage signal U_Ip is equal to (V1+0.7). Under this circumstance, the comparing signal Co is in a high-level state. When the filtered U-terminal voltage signal U_Ip is decreased to V1, the comparing signal Co is in a low-level state. Moreover, during the high-level state of the comparing signal Co, the counter 254 is enabled and the count value cnt is outputted from the counter 254.

Figure 8B:
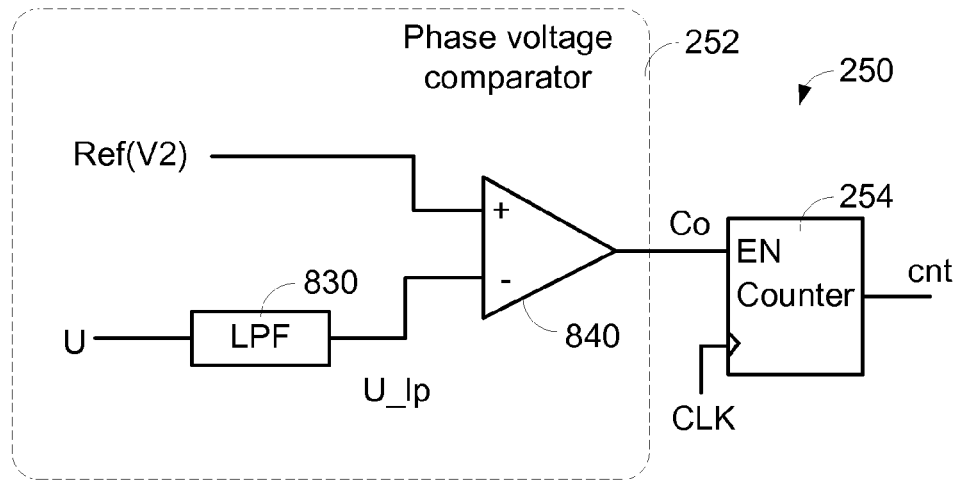
FIG. 8B is a schematic circuit block diagram illustrating a third exemplary demagnetization measuring circuit of the spindle motor driving apparatus according to the embodiment of the invention.

FIG. 8B is a circuit block diagram illustrating a third exemplary demagnetization measuring circuit of the spindle motor driving apparatus according to an embodiment of the invention. The demagnetization measuring circuit 250 comprises the phase voltage comparator 252 and the counter 254. The phase voltage comparator 252 comprises a low pass filter (LPF) 830 and a comparing circuit 840. The low pass filter 830 is connected with the terminal U for generating a filtered U-terminal voltage signal U_Ip. Moreover, a positive input end (+) of the comparing circuit 840 receives a reference voltage Ref, e.g. the second power supply voltage V2, and a negative input end (−) of the comparing circuit 840 receives the filtered U-terminal voltage signal U_Ip.

At the floating phase p1, the filtered U-terminal voltage signal U_Ip is equal to (V2−0.7). Under this circumstance, the comparing signal Co is in the high-level state. When the filtered U-terminal voltage signal U_Ip is increased to V2, the comparing signal Co in the low-level state. Moreover, during the high-level state of the comparing signal Co, the counter 254 is enabled and the count value cnt is outputted from the counter 254.

From the above descriptions, the invention provides a sensorless spindle motor driving apparatus and a sensorless spindle motor driving method. By dynamically adjusting the floating phases of the modulation signals, the rotation of the spindle motor is smoother. Consequently, the noise is reduced, and the demagnetization time is shortened. In other words, the phase of the spindle motor can be quickly detected.

Furthermore, the invention also provides a spindle motor driving system, comprising a motor controller, a spindle motor with a first terminal, a second terminal and a third terminal, a driving circuit and a demagnetization measuring circuit. The motor controller generates plural modulation signals and plural floating phases corresponding to the plural modulation signals, wherein a floating period comes immediately after an active period of each of the plural modulation signals, wherein a first modulation signal of the plural modulation signals corresponds to a first floating phase of the plural floating phases. The driving circuit receives the plural modulation signals, and generates a first terminal voltage signal to the first terminal, a second terminal voltage signal to the second terminal and a third terminal voltage signal to the third terminal. The demagnetization measuring circuit, connected to the first terminal, at the first floating phase, measures a change of the first terminal voltage signal so as to calculate a demagnetization time of the spindle motor. Preferably, the motor controller adjusts the plural floating phases corresponding to the plural modulation signals if the demagnetization time is not smaller than a threshold time period. Preferably, after the demagnetization time, a phase of the spindle motor is obtained by the motor controller according to the first terminal voltage signal.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A spindle motor driving apparatus coupled to a first terminal, a second terminal and a third terminal of a spindle motor, comprising:
   a motor controller for generating plural modulation signals and plural floating phases corresponding to the plural modulation signals, wherein a floating period comes immediately after an active period of each of the plural modulation signals, wherein a first modulation signal of the plural modulation signals corresponds to a first floating phase of the plural floating phases;
   a driving circuit receiving the plural modulation signals, and generating a first terminal voltage signal to the first terminal, a second terminal voltage signal to the second terminal and a third terminal voltage signal to the third terminal;
   a demagnetization measuring circuit connected to the first terminal, wherein at the first floating phase, the demagnetization measuring circuit measures a change of the first terminal voltage signal so as to calculate a demagnetization time of the spindle motor; and
   if the demagnetization time is not smaller than a threshold time period, the motor controller adjusts the plural floating phases corresponding to the plural modulation signals.

2. The spindle motor driving apparatus as claimed in claim 1, wherein if the demagnetization time is smaller than the threshold time period, after the demagnetization time, a phase of the spindle motor is obtained by the motor controller according to the first terminal voltage signal.

3. The spindle motor driving apparatus as claimed in claim 2, wherein the demagnetization measuring circuit comprises:
   a low pass filter receiving the first terminal voltage signal, and outputting a filtered first terminal voltage signal;

a comparing circuit having a first end receiving a reference voltage and a second end receiving the filtered first terminal voltage signal, wherein the comparing circuit generates a comparing signal according to the reference voltage and the filtered first terminal voltage signal; and a counter having an enabling terminal receiving the comparing signal and a clock terminal receiving a clock signal, wherein when the enabling terminal is enabled at the first floating phase, the counter generates a count value to indicate the demagnetization time.

4. The spindle motor driving apparatus as claimed in claim 2, wherein the demagnetization measuring circuit comprises:

a low pass filter receiving the first terminal voltage signal, and outputting a filtered first terminal voltage signal;

a comparing circuit having a first end receiving a reference voltage and a second end receiving the filtered first terminal voltage signal, wherein the comparing circuit generates a comparing signal according to the reference voltage and the filtered first terminal voltage signal; and a counter having an enabling terminal receiving the comparing signal and a clock terminal receiving a clock signal, wherein when the enabling terminal is enabled at a second floating phase of the plural floating phases, the counter generates a count value to indicate the demagnetization time.

5. The spindle motor driving apparatus as claimed in claim 1, wherein the plural modulation signals further comprises a second modulation signal, a third modulation signal, a fourth modulation signal, a fifth modulation signal and a sixth modulation signal, wherein the driving circuit comprises:

a first driving transistor, wherein a gate terminal of the first driving transistor receives the first modulation signal, a drain terminal and a source terminal of the first driving transistor are connected between a first power supply voltage and the first terminal, and a first body diode of the first driving transistor is connected with the drain terminal and the source terminal of the first driving transistor;

a second driving transistor, wherein a gate terminal of the second driving transistor receives the second modulation signal, a drain terminal and a source terminal of the second driving transistor are connected between a second power supply voltage and the third terminal, and a second body diode of the second driving transistor is connected with the drain terminal and the source terminal of the second driving transistor;

a third driving transistor, wherein a gate terminal of the third driving transistor receives the third modulation signal, a drain terminal and a source terminal of the third driving transistor are connected between the first power supply voltage and the second terminal, and a third body diode of the third driving transistor is connected with the drain terminal and the source terminal of the third driving transistor;

a fourth driving transistor, wherein a gate terminal of the fourth driving transistor receives the fourth modulation signal, a drain terminal and a source terminal of the fourth driving transistor are connected between the second power supply voltage and the first terminal, and a fourth body diode of the fourth driving transistor is connected with the drain terminal and the source terminal of the fourth driving transistor;

a fifth driving transistor, wherein a gate terminal of the fifth driving transistor receives the fifth modulation signal, a drain terminal and a source terminal of the fifth driving transistor are connected between the first power supply voltage and the third terminal, and a fifth body diode of the fifth driving transistor is connected with the drain terminal and the source terminal of the fifth driving transistor; and a sixth driving transistor, wherein the gate terminal of the sixth driving transistor receives the sixth modulation signal, a drain terminal and a source terminal of the sixth driving transistor are connected between the second power supply voltage and the second terminal, and a sixth body diode of the sixth driving transistor is connected with the drain terminal and the source terminal of the sixth driving transistor.

6. The spindle motor driving apparatus as claimed in claim 5, wherein the second modulation signal corresponds to a second floating phase, the third modulation signal corresponds to a third floating phase, the fourth modulation signal corresponds to a fourth floating phase, the fifth modulation signal corresponds to a fifth floating phase, and the sixth modulation signal corresponds to a sixth floating phase.

7. The spindle motor driving apparatus as claimed in claim 6, wherein the demagnetization measuring circuit comprises:

a first multiplexer receiving a first reference voltage and a second reference voltage, and selecting one of the first reference voltage and the second reference voltage as an output reference voltage according to a reference control signal from the motor controller;

a second multiplexer connected to the first terminal, the second terminal and the third terminal, and selecting one of the first terminal voltage signal, the second terminal voltage signal and the third terminal voltage signal as an output phase signal according to a phase control signal from the motor controller;

a low pass filter receiving the output phase signal, and outputting a filtered output phase signal;

a comparing circuit having a first end receiving the output reference voltage and a second end receiving the filtered output phase signal, wherein the comparing circuit generates a comparing signal according to the output phase signal and the filtered output phase signal; and a counter having an enabling terminal receiving the comparing signal and a clock terminal receiving a clock signal, wherein when the enabling terminal is enabled, the counter generates a count value to indicate the demagnetization time.

8. The spindle motor driving apparatus as claimed in claim 7, wherein the first power supply voltage is equal to the first reference voltage and the second power supply voltage is equal to the second reference voltage.

9. A method for driving a spindle motor having a first terminal, a second terminal and a third terminal, the method comprising steps of:

(a) adjusting plural modulation signals and plural floating phases corresponding to the plural modulation signals;

(b) detecting a first floating period to come immediately after an active period of a first modulation signal of the plural modulation signals according to a first floating phase of the plural floating phases;

(c) acquiring a demagnetization time according to a first terminal voltage signal at the first terminal of the spindle motor during the first floating period;

(d) selectively adjusting the first floating phase according to the demagnetization time; and the step (d) further comprises a step of:

judging whether the demagnetization time is smaller than a threshold time period, wherein if the demagnetization time is not smaller than the threshold time period, the step (a) to step (c) are repeated.

10. The driving method as claimed in claim 9, wherein if the demagnetization time is smaller than the threshold time period, after the demagnetization time, a phase of the spindle motor is obtained according to the first terminal voltage signal.

11. The driving method as claimed in claim 10, wherein the demagnetization time is detected by a demagnetization measuring circuit, comprising:

a low pass filter receiving the first terminal voltage signal, and outputting a filtered first terminal voltage signal;

a comparing circuit having a first end receiving a reference voltage and a second end receiving the filtered first terminal voltage signal, wherein the comparing circuit generates a comparing signal according to the reference voltage and the filtered first terminal voltage signal; and a counter having an enabling terminal receiving the comparing signal and a clock terminal receiving a clock signal, wherein when the enabling terminal is enabled at the first floating phase, the counter generates a count value to indicate the demagnetization time.

12. The driving method as claimed in claim 9, wherein a driving circuit receives the plural modulation signals and generates the first terminal voltage signal to the first terminal of the spindle motor, a second terminal voltage signal to the second terminal of the spindle motor and a third terminal voltage signal to the third terminal of the spindle motor.

13. The driving method as claimed in claim 12, wherein the plural modulation signals comprise the first modulation signal, a second modulation signal, a third modulation signal, a fourth modulation signal, a fifth modulation signal and a sixth modulation signal, wherein the driving circuit comprises:

a first driving transistor, wherein a gate terminal of the first driving transistor receives the first modulation signal, a drain terminal and a source terminal of the first driving transistor are connected between a first power supply voltage and the first terminal, and a first body diode of the first driving transistor is connected with the drain terminal and the source terminal of the first driving transistor;

a second driving transistor, wherein a gate terminal of the second driving transistor receives the second modulation signal, a drain terminal and a source terminal of the second driving transistor are connected between a second power supply voltage and the third terminal, and a second body diode of the second driving transistor is connected with the drain terminal and the source terminal of the second driving transistor;

a third driving transistor, wherein a gate terminal of the third driving transistor receives the third modulation signal, a drain terminal and a source terminal of the third driving transistor are connected between the first power supply voltage and the second terminal, and a third body diode of the third driving transistor is connected with the drain terminal and the source terminal of the third driving transistor;

a fourth driving transistor, wherein a gate terminal of the fourth driving transistor receives the fourth modulation signal, a drain terminal and a source terminal of the fourth driving transistor are connected between the second power supply voltage and the first terminal, and a fourth body diode of the fourth driving transistor is connected with the drain terminal and the source terminal of the fourth driving transistor;

a fifth driving transistor, wherein a gate terminal of the fifth driving transistor receives the fifth modulation signal, a drain terminal and a source terminal of the fifth driving transistor are connected between the first power supply voltage and the third terminal, and a fifth body diode of the fifth driving transistor is connected with the drain terminal and the source terminal of the fifth driving transistor; and a sixth driving transistor, wherein the gate terminal of the sixth driving transistor receives the sixth modulation signal, a drain terminal and a source terminal of the sixth driving transistor are connected between the second power supply voltage and the second terminal, and a sixth body diode of the sixth driving transistor is connected with the drain terminal and the source terminal of the sixth driving transistor.

14. A spindle motor driving system, comprising:

a motor controller for generating plural modulation signals and plural floating phases corresponding to the plural modulation signals, wherein a floating period comes immediately after an active period of each of the plural modulation signals, wherein a first modulation signal of the plural modulation signals corresponds to a first floating phase of the plural floating phases;

a spindle motor, having a first terminal, a second terminal and a third terminal;

a driving circuit receiving the plural modulation signals, and generating a first terminal voltage signal to the first terminal, a second terminal voltage signal to the second terminal and a third terminal voltage signal to the third terminal;

a demagnetization measuring circuit connected to the first terminal, wherein at the first floating phase, the demagnetization measuring circuit measures a change of the first terminal voltage signal so as to calculate a demagnetization time of the spindle motor; and wherein the motor controller adjusts the plural floating phases corresponding to the plural modulation signals if the demagnetization time is not smaller than a threshold time period.

15. The driving system as claimed in claim 14, wherein the system is sensorless.

16. The driving system as claimed in claim 14, wherein if the demagnetization time is smaller than the threshold time period, after the demagnetization time, a phase of the spindle motor is obtained by the motor controller according to the first terminal voltage signal.

* * * * *